(12) United States Patent
Anderson (10) Patent No.: US 7,171,230 B2
(45) Date of Patent: Jan. 30, 2007

(54) METHOD AND ARRANGEMENT FOR POWER CONTROL

(75) Inventor: Nicholas Anderson, Bath (GB)

(73) Assignee: IPWireless, Inc., San Bruno, CA (US)

(*) Notice: Subject to any disclaimer, the term of this patent is extended or adjusted under 35 U.S.C. 154(b) by 19 days.

(21) Appl. No.: 10/278,366

(22) Filed: Oct. 23, 2002

(65) Prior Publication Data
US 2005/0003846 A1  Jan. 6, 2005

(30) Foreign Application Priority Data
Oct. 24, 2001 (GB) ................... 0125504.1

(51) Int. Cl.
*H04B 7/15* (2006.01)
(52) U.S. Cl. ............... 455/522; 455/63.1; 455/67.13; 455/115.1; 455/127.1
(58) Field of Classification Search ............... 455/522, 455/69, 63.1, 67.11, 67.13–14, 115.1, 2, 127.1, 455/5
See application file for complete search history.

(56) References Cited

U.S. PATENT DOCUMENTS

| | | | | |
|---|---|---|---|---|
| 6,085,106 A | * | 7/2000 | Sendonaris et al. | ......... 455/522 |
| 6,597,723 B1 | * | 7/2003 | Zeira et al. | ............. 455/522 X |
| 6,628,956 B2 | * | 9/2003 | Bark et al. | .................. 455/522 |
| 6,823,194 B2 | * | 11/2004 | Haim | .......................... 455/522 |
| 2003/0103530 A1 | * | 6/2003 | Durastante | ................... 370/509 |

FOREIGN PATENT DOCUMENTS

| | | |
|---|---|---|
| EP | 1 071 227 | 1/2001 |
| WO | WO-96/31009 | 10/1996 |
| WO | WO-99/07105 | 2/1999 |
| WO | WO-00/57574 | 9/2000 |
| WO | WO-01/08322 | 8/2001 |

OTHER PUBLICATIONS

International Search Report for PCT/GB02/04811, mailed on Jan. 21, 2003, 3 pages.

* cited by examiner

*Primary Examiner*—Matthew D. Anderson
*Assistant Examiner*—Philip J. Sobutka
(74) *Attorney, Agent, or Firm*—Morrison & Foerster LLP (57) ABSTRACT

A method for performing power control in a wireless communication unit (112) operating in a wireless communication system (100), includes the steps of: determining (315) a path loss correlation metric to derive one or more parameters pertaining to a wireless transmission; and adjusting an output power level of said wireless communication unit in response to said one or more parameters.

Basing power control calculations on a path loss correlation metric provides the advantage of improved power control performance particularly for slow moving subscriber equipment without compromising power control performance at high speed.

36 Claims, 6 Drawing Sheets

METHOD AND ARRANGEMENT FOR POWER CONTROL

FIELD OF THE INVENTION

This invention relates to power control in a wireless communication system. The invention is applicable to, but not limited to, open loop power control in a UMTS terrestrial radio access (UTRA) time division duplex (TDD), code division multiple access (CDMA) communication system.

BACKGROUND OF THE INVENTION

Wireless communication systems, for example cellular telephony or private mobile radio communication systems, typically provide for radio telecommunication links to be arranged between a plurality of base transceiver stations (BTS), referred to as Node Bs with regard to universal mobile telecommunication system (UMTS) systems, and a plurality of subscriber units, often referred to as user equipment (UE) in UMTS systems.

The communication link from a Node B to a UE is generally referred to as a down-link communication channel. Conversely, the communication link from a UE to a Node B is generally referred to as an up-link communication channel.

In a UTRA wireless communication system, each Node B has associated with it a particular geographical coverage area (or cell). The coverage area is defined by a particular range over which the Node B can maintain acceptable communications with UEs operating within its serving cell. Often these cells combine to produce an extensive coverage area.

In such wireless communication systems, methods for communicating information simultaneously exist where communication resources in a communication network are shared by a number of users. Such methods are termed multiple access techniques. A number of multiple access techniques exist, whereby a finite communication resource is divided into any number of physical parameters, such as:

i) Frequency division multiple access (FDMA) whereby frequencies used in the communication system are shared, ii) Time division multiple access (TDMA) whereby each frequency used in the communication system, is shared amongst users by dividing the communication resource (each frequency) into a number of distinct time periods (time-slots, frames, etc.), and (iii) Code division multiple access (CDMA) whereby communication is performed by using all of the respective frequencies, in all of the time periods, and the resource is shared by allocating each communication a particular code, to differentiate desired signals from undesired signals.

Within such multiple access techniques, different duplex (substantially simultaneous two-way communication) paths are arranged. Such paths can be arranged in a frequency division duplex (FDD) configuration, whereby a first frequency is dedicated for up-link communication and a second frequency is dedicated for down-link communication.

Alternatively, the paths can be arranged in a time division duplex (TDD) configuration, whereby a first time period is dedicated for up-link communication and a second time period is dedicated for down-link communication within the same frequency channel. In addition, some communication channels are used for carrying traffic and other channels are used for transferring control information, such as call paging, between the base station and the subscriber units.

Wireless communication systems are distinguished over fixed communication systems, such as the public switched telephone network (PSTN), principally in that mobile stations/subscriber equipment move between coverage areas served by different Node B (and/or different service providers). In doing so, the mobile stations/subscriber equipment encounter varying radio propagation environments. In particular, in a mobile context, a received signal level can vary rapidly due to multipath and fading effects.

The present invention will be described with respect to a $3^{rd}$ generation partnership project (3GPP) communication system based on the universal mobile telecommunications standard (UMTS). UMTS is a CDMA-based system. A CDMA system employs spread spectrum signaling. Two categories of spread spectrum communications are direct sequence spread spectrum (DSSS) and frequency hopping spread spectrum (FHSS).

In the case of a DSSS communication system, for example, the spectrum of a signal can be most easily spread by multiplying it with a wide-band pseudo-random code generated signal. It is essential that the spreading signal be precisely known so that the receiver can de-spread the signal. A cellular communication system using DSSS is commonly known as a Direct Sequence Code Division Multiple Access (DS-CDMA) system, one example of which is defined in the TIA-EAI standard IS-95. Individual users in the system use the same radio frequencies (RF) and time slots but they are distinguishable from each other by the use of individual spreading codes. Hence, multiple communications channels are allocated using a number of spreading codes within a portion of the radio spectrum. Each code is uniquely assigned to a UE, except for common channels.

One feature associated with most wireless communication systems, which is particularly needed in a UTRA system, allows the transceivers in the Node B and UE to adjust their transmission output power to take into account the geographical distance between them. The closer the UE is to the Node B's transceiver, the less power the UE and Node B's transceivers are required to transmit, for the transmitted signal to be adequately received by the other unit. This 'power control' feature saves battery power in the UE and also helps to reduce interference effects. Initial power settings for the UE, along with other control information, are set by the information provided on a beacon physical channel for a particular cell.

In the context of the present invention, both up-link and down-link power settings can be controlled independently, although the present invention is described primarily with regard to up-link power control.

Precise reverse link power control is a vital element of CDMA systems as the spreading codes are not orthogonal on the reverse link. Hence, any error in the power control (PC) levels introduces interference that directly reduces system capacity.

Furthermore, it is known that the 3GPP standard is particularly sensitive to power control mismatches in the up-link because of fast fading effects in the communication channel. Fast fading is a known and generally undesirable phenomenon caused by the signal arriving at a receiver via a number of different paths. Therefore, in order to achieve maximum up-link capacity in a CDMA system, fast power control loops are required.

An inner power control (PC) loop is provided to adjust a UE's transmission power to counter the so-called "near-far" problem. The inner power control loop adjusts the transmission power of each connection such that the received signal power observed at the Node B is sufficient to meet a particular quality of service (QoS) requirement of each particular connection; thereby reducing interference to others in the system. The inner PC loop adjusts the UE's transmission power in order to keep the received reverse link signal-to-interference ratio (SIR) as close to constant as possible.

The predetermined threshold, to which the inner loop SIR measure is compared, is generated by the outer, quality-driven, power control loop. This loop sets a target SIR threshold that is proportionate with the required quality of service (QoS) for a given connection (usually defined in terms of target bit error rate (BER) or frame error rate (FER)). This target will vary as propagation conditions change, for example as a function of each UE's speed and its specific propagation environment, as both have an impact on the SIR required at the Node B to maintain the desired QoS.

The inner loop simply adjusts the transmit power from a UE to achieve the desired received SIR observed at the Node B. The actual transmit power of a UE generally has a fixed dynamic range that is primarily dictated by practical size and cost constraints. This means that the transmit power of the UE is constrained to lie somewhere within this range. If the UE is situated close to a Node B that it is communicating with, then the path loss between the UE and the Node B will, in general, be low, meaning that the transmission power of the UE to achieve a given SIR can also be low.

In the context of the present invention, an open-loop power control scheme is used in UTRA TDD-CDMA whereby user equipment (UE) adapts its transmit output level in accordance with measured path loss variations. These path loss variations are determined by regular measurements of the received signal code power (RSCP) of a downlink beacon physical channel. In the RSCP, the UE is provided with the reference power at which the beacon channel was transmitted. Hence, when this value is compared to the measured level of the received signal, the path loss can be calculated.

The UE then compensates for changes in the path loss by transmitting more or less power depending on whether the path loss has increased or decreased respectively.

Nominally, the open loop scheme runs at the radio frame rate of 10 msec., although an option exists within the UTRA standard to run at twice this rate by utilising two beacon physical channels per frame, i.e. spaced eight timeslots (8/15ths of a frame) apart.

Due to the update rate limitations of the scheme, the effectiveness of the loop at combating the aforementioned fast fading problem decreases with increasing UE speed. Hence, as PC is a critical issue in CDMA systems, a solution to the implementation of effective PC at high subscriber unit speeds is required.

The technical specification 'TS25.224' of the 3rd Generation Partnership Project (3GPP) specifies that a weighting parameter $\alpha$ can be used to weight the path loss towards the long-term-averaged path loss ($L_0$) and the instantaneous path loss $L_{P\text{-}CCPCH}$ as required. The equation that is used to implement the open loop power control scheme, is:

$$P_{UL} = \alpha L_{P\text{-}CCPCH} + (1-\alpha)L_0 + I_{BTS} + SIR_{TARGET} + \text{Const.} \quad [1]$$

Where:
$P_{UL}$: Power setting in dBm. This value corresponds to a particular CCTrCH (due to CCTrCH-specific $SIR_{TARGET}$) and a particular timeslot (due to possibly timeslot-specific $\alpha$ and $I_{BTS}$).

$L_{P\text{-}CCPCH}$: Measure representing path loss in dB (reference transmit power is broadcast on a broadcast channel (BCH)).

$L_0$: Long term average of path loss in dB.

$I_{BTS}$: Interference signal power level at cell's receiver in dBm, which is broadcast on a BCH.

$\alpha$: $\alpha$ is a weighting parameter that represents the quality of path loss measurements. The UTRA standard states: (i) $\alpha$ may be a function of the time delay between the up-link time slot and the most recent down link time slot containing a beacon channel; (ii) $\alpha$ shall be calculated autonomously at the UE, subject to a maximum allowed value which shall be signalled by higher layers.

$SIR_{TARGET}$: Target SIR in dB. A higher layer outer loop adjusts the target SIR.

Const.: This 'constant' value shall be set by higher Layer (defined by respective operators) and is broadcast on BCH.

In an annex of TS25.224 it is suggested that $\alpha$ could be made a function of the "delay" between the instantaneous path loss measurement $L_{P\text{-}CCPCH}$ (where CCPCH is the Common Control Physical Channel) and the up-link timeslot for which the power control calculation is being made.

However, although $\alpha$ could be set to be a function of the delay, or the up-link timeslot position in the frame, it is up to each equipment manufacturer how exactly to configure this set up. Furthermore, it is not apparent how power control performance can be usefully employed when configuring $\alpha$ in this manner.

A need therefore exists, in general, for an improved power control arrangement and method of operation, and in particular, an arrangement and method for open-loop power control for an UTRA-TDD system, wherein the abovementioned disadvantages may be alleviated.

STATEMENT OF INVENTION

In accordance with a first aspect of the present invention, there is provided a method for performing power control in a wireless communication unit operating in a wireless communication system, the method comprising the steps of:
determining a path loss correlation metric to derive one or more parameters pertaining to a wireless transmission; and
adjusting an output power level of said wireless communication unit in response to said one or more parameters.

In accordance with a second aspect of the present invention, there is provided a wireless communication unit adapted to incorporate the method steps of the first aspect.

In accordance with a third aspect of the present invention, there is provided wireless communication system adapted to incorporate the method steps of the first aspect.

In accordance with a fourth aspect of the present invention, there is provided a wireless communication unit capable of performing power control when operating in a wireless communication system, the wireless communication unit comprising:
a power control processing function that includes:
a path loss correlation metric determination function to derive one or more parameters pertaining to a wireless transmission; and
adjustment means operably coupled to said path loss correlation metric determination function to adjust an output power level of said wireless communication unit in response to said one or more parameters.

In accordance with a fifth aspect of the present invention, there is provided a storage medium storing processor-implementable instructions for controlling a processor to carry out the method of the first aspect.

In accordance with a sixth aspect of the present invention, there is provided a differentiator adapted to utilize one or more instantaneous path loss measurements to obtain a path loss correlation indication for use in the path loss correlation metric determination function in accordance with the fourth aspect.

BRIEF DESCRIPTION OF THE DRAWINGS

Exemplary embodiments of the present invention will now be described, with reference to the accompanying drawings, in which.

DESCRIPTION OF PREFERRED EMBODIMENTS

Figure 1:
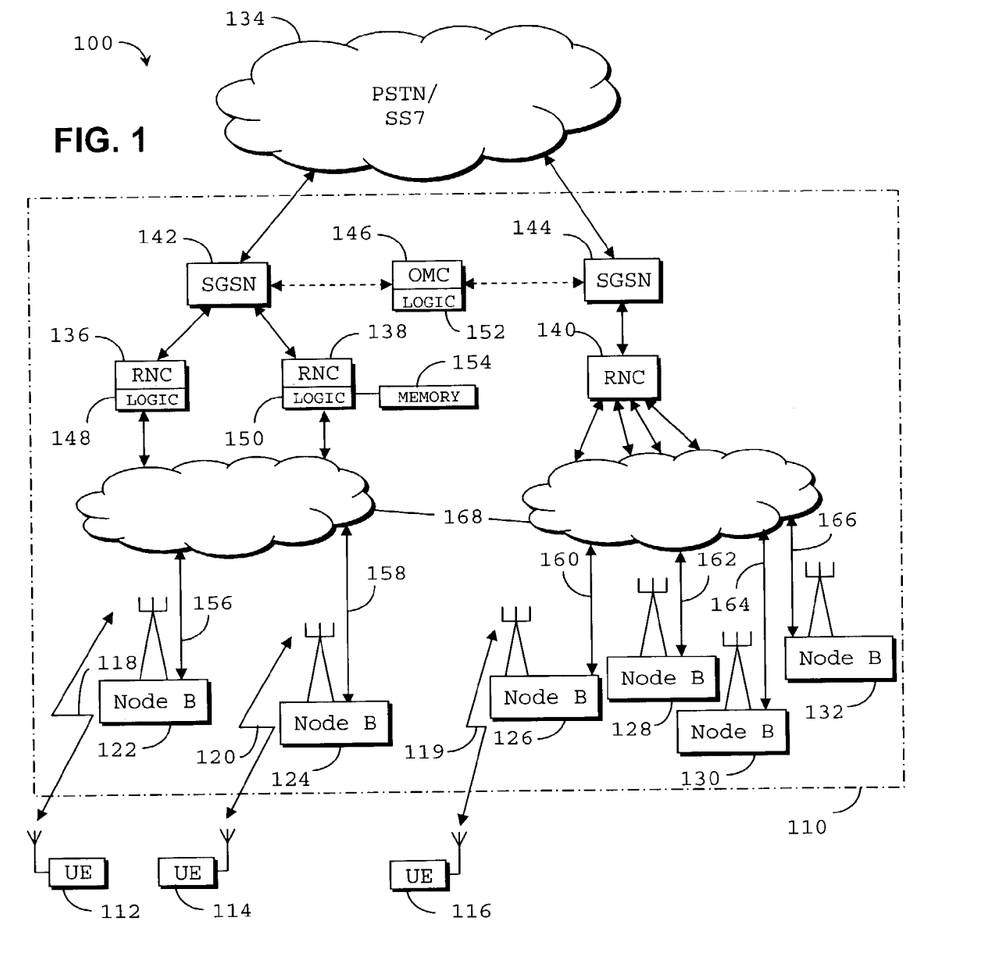
FIG. 1 shows a block diagram of a communication system that can be adapted to support the various inventive concepts of a preferred embodiment of the present invention.

Referring now to FIG. 1, a cellular-based telephone communication system 100 is shown in outline, in accordance with a preferred embodiment of the invention. In the preferred embodiment of the invention, the cellular-based telephone communication system 100 is compliant with, and contains network elements capable of operating over, a UMTS air-interface In particular, the invention relates to the Third Generation Partnership Project (3GPP) specification for wide-band code-division multiple access (WCDMA) standard relating to the UTRAN radio Interface (described in the 3G TS 25.xxx series of specifications).

A plurality of subscriber terminals (or user equipment (UE) in UMTS nomenclature) 112, 114, 116 communicate over radio links 118, 119, 120 with a plurality of base transceiver stations, referred to under UMTS terminology as Node-Bs, 122, 124, 126, 128, 130, 132. The system comprises many other UEs and Node Bs, which for clarity purposes are not shown.

The wireless communication system, sometimes referred to as a Network Operator's Network Domain, is connected to an external network 134, for example the Internet. The Network Operator's Network Domain (described with reference to both a 3$^{rd}$ generation UMTS and a 2$^{nd}$ generation GSM system) includes:

(i) A core network, namely at least one Gateway GPRS Support Node (GGSN) 144 and or at least one Serving GPRS Support Nodes (SGSN); and (ii) An access network, namely:

(ai) a GPRS (or UMTS) Radio network controller (RNC) 136–140; or (aii) Base Site Controller (BSC) in a GSM system and/or (bi) a GPRS (or UMTS) Node B 122–132; or (bii) a Base Transceiver Station (BTS) in a GSM system.

The GGSN/SGSN 144 is responsible for GPRS (or UMTS) interfacing with a Public Switched Data Network (PSDN) such as the Internet 134 or a Public Switched Telephone Network (PSTN) 134. A SGSN 144 performs a routing and tunnelling function for traffic within say, a GPRS core network, whilst a GGSN 144 links to external packet networks, in this case ones accessing the GPRS mode of the system The Node-Bs 122–132 are connected to external networks, through base station controllers, referred to under UMTS terminology as Radio Network Controller stations (RNC), including the RNCs 136, 138, 140 and mobile switching centres (MSCs), such as MSC 142 (the others are, for clarity purposes, not shown) and SGSN 144 (the others are, for clarity purposes, not shown).

Each Node-B 122–132 contains one or more transceiver units and communicates with the rest of the cell-based system infrastructure via an $I_{ub}$ interface, as defined in the UMTS specification.

Each RNC 136–140 may control one or more Node-Bs 122–132. Each MSC 142 provides a gateway to the external network 134. The Operations and Management Centre (OMC) 146 is operably connected to RNCs 136–140 and Node-Bs 122–132 (shown only with respect to Node-B 126 for clarity). The OMC 146 administers and manages sections of the cellular telephone communication system 100, as is understood by those skilled in the art.

In the preferred embodiment of the invention, a number of UEs 112–116 and/or corresponding Node-Bs 122–132 have been adapted, to offer, and provide for, adapted power controlled transmission, reception and processing of power control related information. In particular, the preferred embodiment of the present invention describes a feature that bases power control calculations on a good correlation of path loss across a received frame. In this manner, the feature can be added to the operation of the up-link inner-loop power control loop running at a layer-1 physical layer in the UE, in order to improve power control performance at low UE speed, whilst maintaining appropriate power control at high UE speed. Advantageously, implementation of this invention allows standards compliance to be retained.

More particularly, in this embodiment the above UE elements have been adapted to implement the present invention in either or both up-link or down-link modes of operation. Although the preferred embodiment of the present invention is further described with respect to FIGS. 3 to 6 for UE open loop power control in an up-link channel, it is envisaged that a Node B can in general, use the same inventive concepts in the down-link channel.

In such a closed-loop configuration, the Node B (or BTS) transmits a signal to the UE, which is processed to determine path loss correlated information. This information is transmitted from the UE back to the Node B, where it is received, processed, and PC settings used/assigned based on the path loss correlated information. In this manner, the use of a feature that bases power control calculations on a good correlation of path loss across a received frame can also improve the accuracy in setting down-link power control levels, albeit not in an open loop configuration. Such improved accuracy can help minimise system interference.

It is also envisaged that for other wireless communication systems, other criteria and/or equations could be employed in determining an appropriate power control scheme. Such schemes would still benefit from the concept of using path loss correlation parameters, as described herein.

It is also within the contemplation of the invention that such adaptation of the physical layer (air-interface) elements may be alternatively controlled, implemented in full or implemented in part by adapting any other suitable part of the communication system 100. For example, equivalent elements such as intermediate fixed communication units (for example repeaters) in other types of systems may, in appropriate circumstances, be adapted to provide or facilitate the power control features as described herein.

Figure 2:
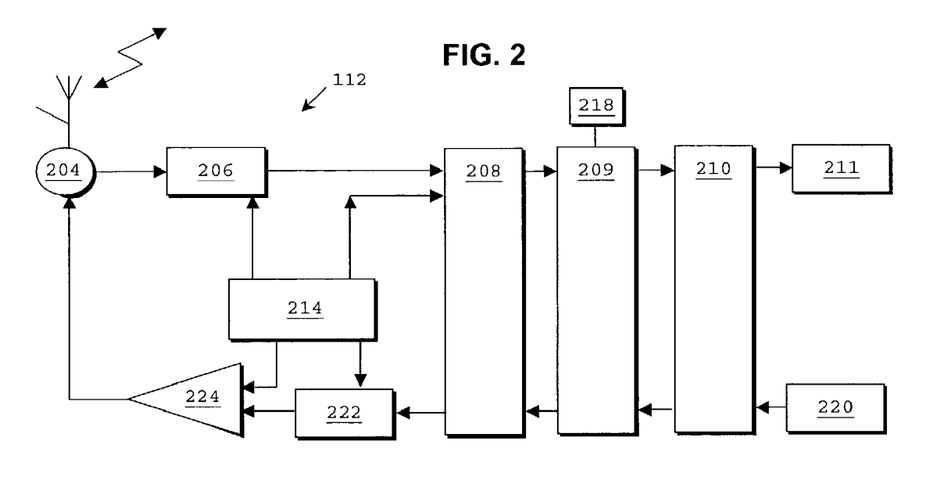
FIG. 2 shows a functional block diagram of a UE, adapted in accordance with various inventive concepts of a preferred embodiment of the present invention.

Referring now to FIG. 2, a block diagram of a UE 112 adapted to support the inventive concepts of the preferred embodiments of the present invention, is shown.

The UE 112 contains an antenna 202 preferably coupled to a duplex filter or circulator 204 that provides isolation between receive and transmit chains within UE 112.

The receiver chain includes receiver front-end circuitry 206 (effectively providing reception, filtering and intermediate or base-band frequency conversion). The front-end circuit 206 receives signal transmissions from its associated Node B. The front-end circuit 206 is serially coupled to a signal processing function (processor, generally realised by a DSP) 208. The processing function 208 performs signal demodulation, error correction and formatting. Recovered information from the signal processing function 208 is serially coupled to a power control processing function 209, which extracts pertinent power control information from the received (RSCP) signal and interprets the information to determine an appropriate transmit output level for the UE's transmissions.

The power control processing function 209 has been adapted in the following manner. In operation, as mentioned earlier, the up-link (UL) inner loop is updated at the radio frame rate of 10 msec. as each consecutive beacon-function RSCP is measured by the power control processing function 209 UE. For pedestrian and slow mobile conditions, where the UE is travelling at up to say, four Km/hr, the loop is capable of compensating for any fast fading present. Beyond these speeds, the radio channel becomes uncorrelated across the 10 msec. frame, and any instantaneous path loss measurement inferred from timeslot '0' can no longer be used as a good indicator of the path loss that will be experienced on any other timeslot in the same frame.

The inventor of the present invention has determined that, when there is good correlation of path loss across a radio frame period, it is better to use the 'instantaneous' measurement of RSCP in the power control processing function 209 for use in the UL open-loop PC calculations.

Conversely, when there is little or no correlation of path loss across the radio frame, the inventor of the present invention has determined that it is better to use, in the power control processing function 209 for UL open-loop PC, either (or both of):

(i) an adjusted 'filtered' (mean) RSCP signal/measurement;

(ii) an adjusted "α" parameter.

In particular, the power control processing function 209 of the preferred embodiment of the present invention involves setting the α value between a logical '1' and a logical '0' dependent upon the frame-to-frame path loss correlation seen in the radio channel. The operation of the power control processing function 209 is further described with respect to FIG. 3 to FIG. 6.

A timer 218 is preferably operably coupled to the processing function 208 and power control processing function 209 to provide synchronisation in the signal recovery process, including recovering the RSCP signal.

In different embodiments of the invention, the signal processing function 208 and baseband processing function 211 may be provided within the same physical device. The power control processing function 209 may also be provided within the same physical device with either the signal processing function 208 or the baseband processing function 211, or both.

As known in the art, received signals that have been processed by the power control processing function 209 are typically input to a baseband-processing device 210. The baseband processing device 210 takes the received information formatted in a suitable manner and sends it to an output device 211, such as an audio speaker or liquid crystal display or visual display unit (VDU). A controller 214 controls the information flow and operational state of each circuit/element/function.

As regards the transmit chain, this essentially includes an input device 220, such as a microphone, coupled in series through a baseband processor 210, a power control processing function 209, signal processing function 208, transmitter/modulation circuitry 222 and a power amplifier 224. The processor 208, transmitter/modulation circuitry 222 and the power amplifier 224 are operationally responsive to the controller, with an output from the power amplifier coupled to the duplex filter or circulator 204, as known in the art.

The transmit chain in UE 112 takes the baseband signal from input device 220 and converts this into a signal whose level can be baseband adjusted by the power control processor 209. The power control processor forwards the amplitude-adjusted signal to the signal processor 208, where it is encoded for transmission by transmit/modulation circuitry 222, thereafter amplified by power amplifier 224, and radiated from antenna 202. Clearly, the adjustment of the transmit output power can be effected by any amplitude or attenuation means in the transmit chain, and the above baseband adjustment is described as one example only.

The signal processor function 208 in the transmit chain may be implemented as distinct from the processor in the receive chain. Alternatively, a single processor 208 may be used to implement processing of both transmit and receive signals, as shown in FIG. 2. Furthermore, the various components within the UE 112 can be realised in discrete or integrated component form.

Figure 3:
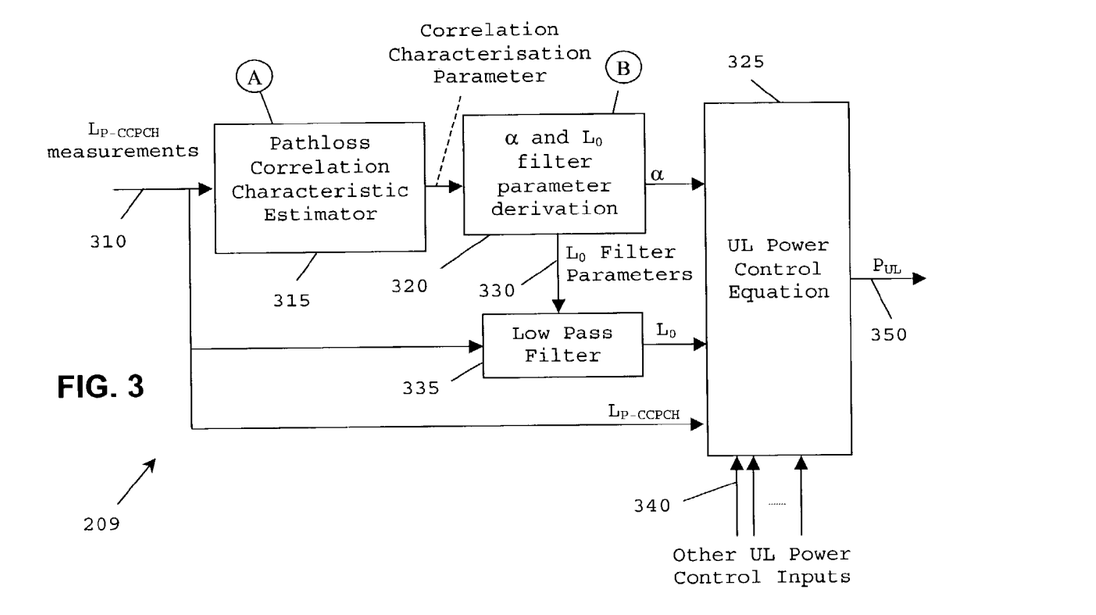
FIG. 3 shows a flowchart/functional block diagram of a power control processing operation of a UE adapted to incorporating the present invention.

Referring now to FIG. 3, a flowchart/functional block diagram of the power control processing operation 209 of a UE, adapted to incorporate the present invention, is shown in more detail.

In accordance with the UTRA recommendation, instantaneous path loss measurements $L_{P\text{-}CCPCH}$ 310 are performed for each received frame. Notably, in accordance with the preferred embodiment of the invention, the historical results of these measurements are used to derive a path loss correlation metric 315. The path loss correlation metric 315 is then used to derive any adjustment to the path loss weighting function α, in the parameter derivation function 320.

It is also envisaged that spectral analysis could be performed on the aforementioned path loss correlation over time of $L_{P\text{-}CCPCH}$ measurements. In this case, it is envisaged that a decision on α (or indeed one or more filter parameter(s) to be adapted as described below) could be based on such spectral analysis.

In addition, or as an alternative, to an adjustment of α, the inventor of the present invention has recognised that an adjustment of the filter bandwidth of the low-pass filter (LPF) 335, used to derive $L_0$ from $L_{P\text{-}CCPCH}$, can also be used for power control level adjustment in response to the path loss correlation information. Such a ($L_0$) filter-adjusted signal can be used instead of the direct instantaneous path loss measurements $L_{P\text{-}CCPCH}$ 310 in the power control calculation. It is envisaged that the $L_0$ filter parameters 330 may also be derived from the path loss correlation metric 315, in parameter derivation function 320.

The characteristics of this LPF 335 are not specified in the UTRA standard. Thus, as an alternative to changing $\alpha$, or in addition to changing $\alpha$, the filter bandwidth may be widened or narrowed in response to the observed correlation in the radio channel path loss. The LPF will likely be implemented as a digital filter and, as such, its frequency response parameters can be adjusted by appropriate adjustment of filter taps, as known to those skilled in the art.

In the preferred embodiment of the present invention, the parameter derivation function 320 therefore includes an algorithm to derive the parameter changes of $\alpha$ and/or $L_0$ for use in the UL power control equation 325.

Hence, as shown in FIG. 3, the UL power control equation 325 can be calculated using the current direct instantaneous path loss measurements $L_{P\text{-}CCPCH}$ 310 or, dependent upon the path loss correlation metric, using parameter adjustments to $\alpha$ and/or a bandwidth-adjusted filtered signal ($L_0$) equivalent to a filtered version of the instantaneous path loss measurements $L_{P\text{-}CCPCH}$ 310 ($L_0$).

For high-speed UE scenarios, the path loss correlation metric 315 is likely to report low path loss correlation. As such, it is envisaged that the $L_{P\text{-}CCPCH}$ direct measurements 310 are not used in the up-link power control equation 325, which also receives the other control inputs 340, as specified in the UTRA standard. This course of action is appropriate since the $L_{P\text{-}CCPCH}$ direct measurements 310 cannot be guaranteed to be applicable to other timeslots in the same radio frame period.

It is within the contemplation of the invention that many techniques could be designed to implement the path loss correlation metric 315 and subsequent adjustment and/or derivation algorithm 320. However, two examples of how the inventive concepts of the present invention could be applied are described below with respect to FIG. 4 and FIG. 6.

Figure 4:
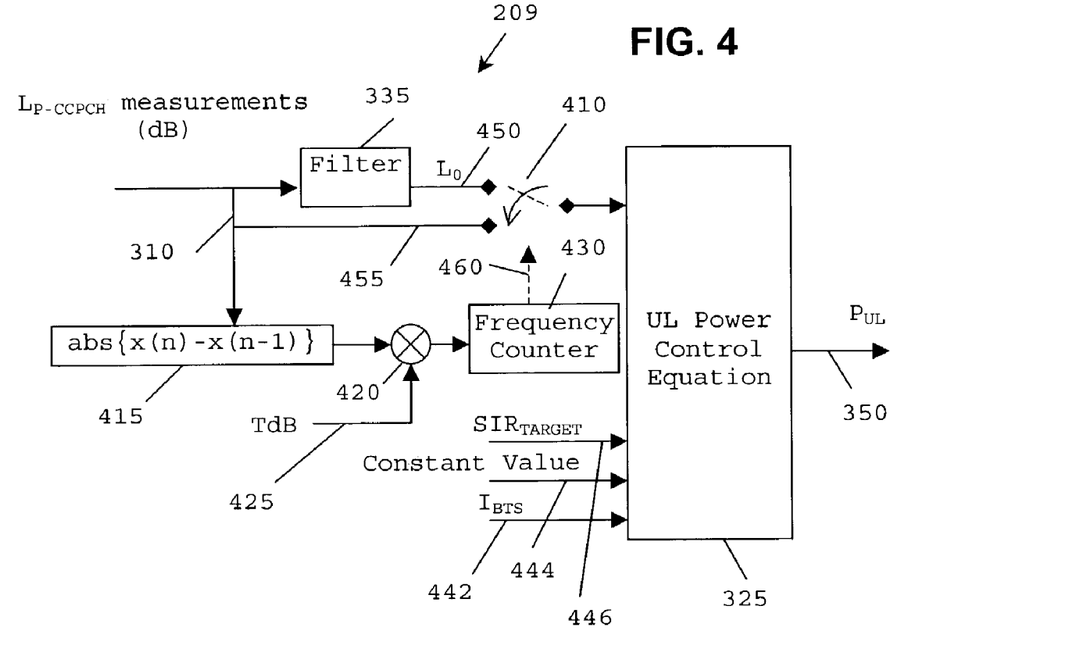
FIG. 4 shows a block schematic diagram illustrating the open-loop power control scheme on which the arrangement of FIG. 3 is based.

Referring now to FIG. 4, a block schematic diagram 209 of a preferred open-loop power control scheme, on which the arrangement of FIG. 3 is based, is illustrated.

As indicated earlier, instantaneous path loss measurements $L_{P\text{-}CCPCH}$ 310 are performed for each received frame. Notably, the results of these measurements are used to perform a path loss correlation metric by inputting them to a differentiator function 415, followed by a thresholder 420 and frequency counter 430. It is envisaged that the differentiator function 415 may be considered essentially as a high-pass filter. Alternatively, for example, the differentiator function 415 may perform a bi-linear transform of a standard difference equation, as known in the art.

In the differentiator function 415, each consecutive $L_{P\text{-}CCPCH}$ 310 measurement (in dB) is compared to the same measurement for the previous frame, and a difference value (Y) produced:

$$Y = abs(x_{(n)} - x_{(n-1)}) \quad [2]$$

The sign of the difference is discarded by taking the absolute (abs) value, and the value is checked in the thresholder 420 to see whether it is above or below a threshold value TdB 425 that is held as a constant in a memory element of the UE 112. This comparison is then input to a counter 430, to determine an $\alpha$-based switch control signal 460. The $\alpha$-based switch control signal 460 ensures that the switch 410 selects the most appropriate measurement to use in the power control equation 325.

If, for example, the counter determines that more than P % of these differences provided by the differentiator function 415 are observed to be smaller than TdB 425, say over a time period $T_{span}$, it can be assumed that there is good path loss correlation over time. Hence, the unfiltered path loss values ($L_{P\text{-}CCPCH}$) 455 (direct instantaneous path loss measurements) are selected for the UL open-loop calculations in response to the $\alpha$-based switch control signal 460 (where $\alpha$='1').

Conversely, if less than P % of these differences provided by the differentiator function 415 are observed to be smaller than TdB 425, it can be assumed that there is poor path loss correlation per time period. In such a case, the filtered $L_{P\text{-}CCPCH}$ value ($L_0$) 450, output from the LPF 335, is selected for the UL open-loop calculations in response to the $\alpha$-based switch control signal 460 (where $\alpha$='0').

Hence, the power control processing function 209 of the preferred embodiment of the present invention involves setting the $\alpha$ value between a logical '1' and a logical '0' dependent upon the frame-to-frame path loss correlation seen in the radio channel.

It is envisaged that suitable values for the above parameters could be, for example, respectively:

$T_{span}$: of the order of 1 or 2 seconds;
TdB 425: of the order of 2 or 3 dB; and
P %: of the order of 70%–80%.

Hence, a weighting of $\alpha$ is given to $L_{P\text{-}CCPCH}$, and a weighting of $(1-\alpha)$ is given to $L_0$. So if $\alpha=0$, we end up using only filtered path loss $L_0$. If $\alpha=1$, we end up using only instantaneous $L_{P\text{-}CCPCH}$ measurements. The switch in FIG. 4 therefore denotes this hard-switching between the two path loss measurements (filtered and unfiltered).

Hence, in the context of this embodiment, the path loss correlation metric determines whether an adapted $L_0$ or the direct $L_{P\text{-}CCPCH}$ measurements are used in the UL power control equation 325. Again, it is envisaged that for high-speed scenarios, the $L_0$ measurements are used in the up-link power control equation 325. Other control inputs such as $SIR_{Target}$ 446, a constant value 444 and $I_{BTS}$ 442 are used, as specified in the UTRA standard. An adjustment algorithm, designed to maximise the benefit of such a scheme, is again used in conjunction with the output 350 of the up-link power control equation 325.

It is within the contemplation of the invention that other inputs may also be used in the final PC equation, together with the path loss correlation indication described herein.

Figure 5:
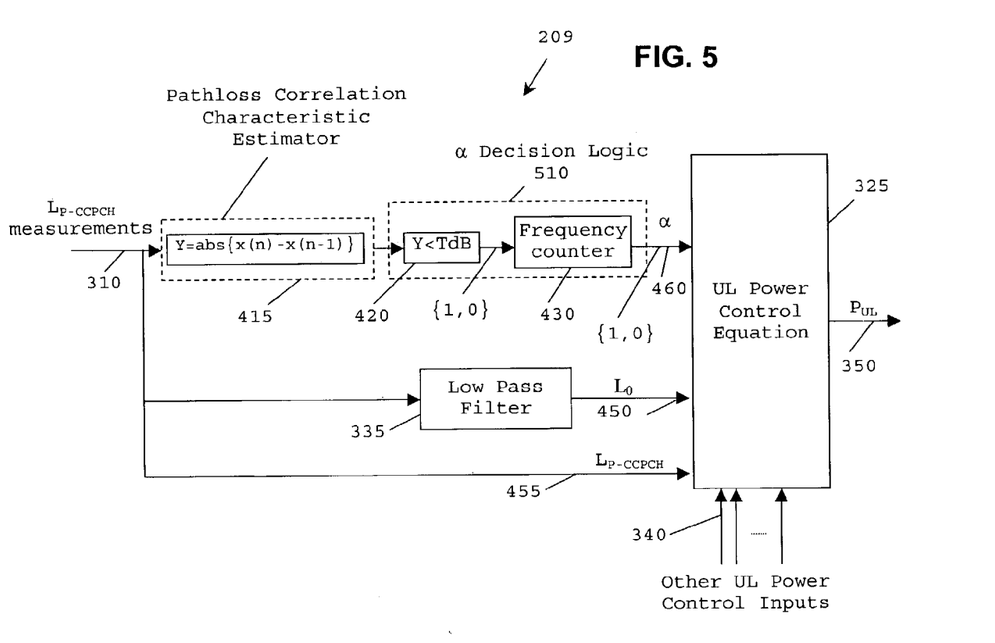
FIG. 5 shows an alternative manner of illustrating the power control processing function 209 of the embodiment of FIG. 4.

Referring now to FIG. 5, an alternative manner of illustrating the power control processing function 209 of the embodiment of FIG. 4, is shown. Again, instantaneous path loss measurements $L_{P\text{-}CCPCH}$ 310 are performed for each received frame. The results of these measurements are used to derive a path loss correlation metric by inputting them to a differentiator function 415, as in FIG. 4.

The output of the differentiator function is then input to an $\alpha$ decision logic function 510 that includes a thresholder 420 followed by a frequency counter 430. The operation is the same as that for FIG. 4, albeit in this arrangement, all three inputs ($\alpha$, $L_{P\text{-}CCPCH}$ 310 and $L_0$ 320) are input directly to the power control equation 325. Hence, no switch or switch control signal, per se, is used to prevent a measurement from being used by the power control equation 325. Clearly, similar parameters to those described with reference to FIG. 4 would also be applicable in FIG. 5.

Figure 6:
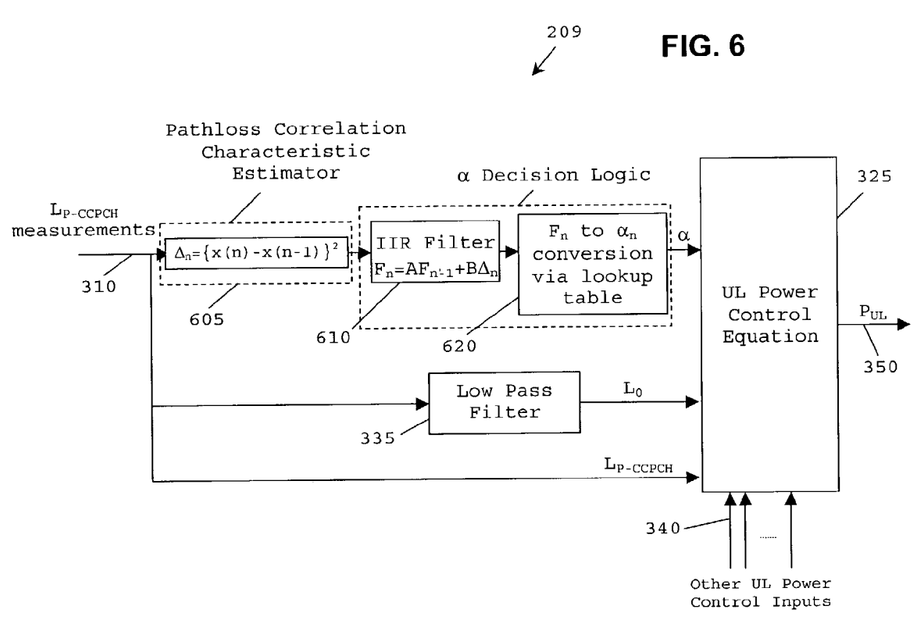
FIG. 6 shows a block schematic diagram illustrating an alternative embodiment for implementing the open-loop power control scheme of FIG. 3.

Referring now to FIG. 6, a block schematic diagram 209 of an alternative embodiment for implementing the open-loop power control scheme of FIG. 3, is illustrated.

Again, instantaneous path loss measurements $L_{P-CCPCH}$ 310 are performed for each received frame. Notably, the results of these measurements are used to perform a path loss correlation metric by inputting them to a differentiator function followed by variance estimator 605.

Again, as in the example of FIG. 4, each consecutive $L_{P-CCPCH}$ 310 measurement from the PCCPCH RSCP signal (in dBm) is compared to the same measurement for the previous frame and a difference value produced $(x_n - x_{n-1})$. In contrast to the embodiment of FIG. 4, the difference value is then squared to produce a variance estimation $\Delta_n$, where:

$$\Delta_n = (x_n - x_{n-1})^2 \quad [3]$$

The variance estimation $\Delta_n$ is then filtered using, for example, a simple IIR filter 610 to produce the function:

$$F_n = A.F_{n-1} + B.\Delta_n \quad [4]$$

where:

A and B are filter coefficients, and
'A+B'='1'

It is noteworthy that if n=0, i.e. it is the first iteration, the IIR filter 610 is initialised with:

$$F_0 = \Delta_n \quad [5]$$

The $\alpha$ decision logic 615 then derives $\alpha_n$ from $F_n$ via a lookup table 620. A typical example is shown below in Table 1.

TABLE 1

| $\alpha_n$ | $F_n$ |
|---|---|
| 0 | <3 |
| 0.1 | <3.5 |
| 0.2 | <4 |
| 0.3 | <4.3 |
| 0.4 | <4.6 |
| 0.5 | <4.9 |
| 0.6 | <5.2 |
| 0.7 | <5.5 |
| 0.8 | <5.8 |
| 0.9 | <6.1 |
| 1.0 | <6.4 |

In operation, the lowest value of $\alpha_n$ satisfying the right hand column is selected. The values in the right hand column are preferably programmable and may be used to optimise performance the performance of the power control scheme. The values in the right hand column of the table effectively control the variation of $\alpha$ in response to the variance estimate of the differentiated path loss. They may be optimised either via computer simulation of loop performance, or via appropriate in-field or laboratory testing.

The various components within the UE 112 are realised in this embodiment in integrated component form. Of course, in other embodiments, they may be realized in discrete form, or a mixture of integrated components and discrete components, or indeed any other suitable form.

Furthermore, in this embodiment the power control processor function is implemented preferably in a digital signal processor. However, it is within the contemplation of the invention that the power control processor function 209 described in the above embodiments can be embodied in any suitable form of software, firmware or hardware. The power control processor function 209 may be controlled by processor-implementable instructions and/or data, for carrying out the methods and processes described, which are stored in a storage medium or memory, for example the memory element 216. The processor-implementable instructions and/or data may include any of the following:

(i) The algorithm for deriving the $\alpha$ and/or $L_O$ parameters,
(ii) A new or adapted lookup table,
(iii) A new or adapted path loss correlation metric algorithm for use in function 315,
(iv) A new threshold value 425,
(v) A new frequency counter value (P), or
(vi) A new time period $T_{span}$, used to generate the path loss correlation metric.

The memory can be a circuit component or module, e.g. a RAM or PROM, or a removable storage medium such as a disk, or other suitable medium.

It will be understood that the method and arrangement for open-loop power control described above provides at least the following advantages:

(i) Improved power control performance for slow moving mobiles without compromising performance at high speed.

(ii) Implementation of the path loss correlation metric improves the UE power control performance whilst remaining standard compliant with the UTRA-TDD PC operation.

(iii) Although the use of a path loss correlation metric finds particular benefits in an up-link open-loop scenario, similar measurements can be used by the Node B or BTS to improve the accuracy in closed loop power control techniques. Hence, the technique is also beneficial in a down-link context.

(iv) The equipment designer has a choice on how best to implement the inventive concepts, using either an $\alpha$ adjustment or adjustment of the LPF characteristics.

Hence, the aforementioned method and arrangement for providing power control substantially negates at least the problems associated with the update rate limitations of the PC scheme in an UTRA-TDD CDMA wireless communication system. Furthermore, improved power control at lower speeds is achieved when there is a good correlation of path loss across a radio frame period, by using the instantaneous measurement of RSCP for use in the UL open-loop PC calculations. Conversely, when there is little or no correlation of path loss across the radio frame at high speeds, the filtered (mean) RSCP measurement is used for UL open-loop PC.

Thus, a configuration and method for effecting power control in a wireless communication system has been described wherein the aforementioned disadvantages associated with prior art arrangements has been substantially alleviated.

Whilst specific, and preferred, implementations of the present invention are described above, it is clear that one skilled in the art could readily apply variations and modifications of such inventive concepts.

The invention claimed is:

1. A method for performing power control in a wireless communication unit operating in a wireless communication system, the method comprising:
   determining a plurality of path losses for a wireless transmission, each path loss corresponding to one of a plurality of wireless transmission times;
   deriving at least one parameter from a correlation between or among at least two of the plurality of path losses; and
   adjusting an output power level of said wireless communication unit in response to said at least one parameter.

2. The method for performing power control in a wireless communication unit according to claim 1, wherein the adjusting of the output power level of said wireless communication unit is performed in an open-loop power control manner for an up-link transmission by a wireless subscriber communication unit.

3. The method for performing power control in a wireless communication unit according to claim 1, wherein said adjusting of the output power level of said wireless communication unit comprises at least one of adjusting a weighting parameter, and adjusting a frequency response of a filter.

4. The method for performing power control in a wireless communication unit according to claim 1, wherein said wireless communication unit is a wireless subscriber unit, and said power control is performed by the wireless subscriber unit for use in an open-loop up-link power control mode of operation.

5. The method for performing power control in a wireless communication unit according to claim 1, the method further comprising making a plurality of instantaneous path loss measurements over a plurality of frames received by said wireless communication unit; wherein said determining of said path loss correlation metric is based on said plurality of instantaneous path loss measurements.

6. The method for performing power control in a wireless communication unit according to claim 5, the method further comprising:
performing spectral analysis on said plurality of instantaneous path loss measurements to derive said weighting parameter adjustment or said filter frequency response adjustment.

7. The method for performing power control in a wireless communication unit according to claim 5, wherein said determining of said path loss correlation metric comprises comparing a first instantaneous path loss measurement to at least one previous instantaneous path loss measurement.

8. The method for performing power control in a wireless communication unit according to claim 7, the method further comprising determining a difference value from said comparison step, and discarding a sign of said difference value to obtain an absolute difference value to provide a path loss correlation indication.

9. The method for performing power control in a wireless communication unit according to claim 8, the method further comprising comparing said absolute difference value with a threshold value to provide a path loss correlation metric.

10. The method for performing power control in a wireless communication unit according to claim 8, further comprising performing a variance estimation including said difference value to provide a path loss correlation metric.

11. The method for performing power control in a wireless communication unit according to claim 8, the method further comprising:
using said plurality of instantaneous path loss measurements to determine the adjustment of the output power level of said wireless communication unit if said absolute difference value is determined to be below a threshold value for more than a specified percentage of a period of time; or
using a filtered combination of said plurality of instantaneous path loss measurements to determine the adjustment of the output power level of said wireless communication unit if said absolute difference value is determined to be above the threshold value for more than the specified percentage of a period of time.

12. The method for performing power control in a wireless communication unit according to claim 11, the method further comprising:

selecting a filtered combination of said plurality of instantaneous path loss measurements for calculating an output power level of said wireless communication unit when said wireless communication unit is traveling at a relatively high speed; or
selecting said plurality of instantaneous path loss measurements for calculating an output power level of said wireless communication unit when said wireless communication unit is traveling at a relatively low speed.

13. The method for performing power control in a wireless communication unit according to claim 8, further comprising performing an averaging function to provide a time-averaged path loss correlation metric.

14. The method for performing power control in a wireless communication unit according to claim 13, further comprising:
comparing said time-averaged path loss correlation metric to values held in a lookup table, and
determining a weighting parameter based upon said comparison.

15. The method for performing power control in a wireless communication unit according to claim 14, further comprising selecting a number of said plurality of instantaneous path loss measurements, based on said weighting parameter, to determine the adjustment of the output power level.

16. A wireless communication system comprising:
power control processing means, further comprising:
means for determining a plurality of path losses for a wireless transmission, each path loss corresponding to one of a plurality of wireless transmission times;
means for deriving at least one parameter from a correlation between or among at least two of the plurality of path losses; and
adjustment means to adjust an output power level of said wireless communication unit in response to said at least one parameter.

17. The wireless communication system according to claim 16, wherein said communication system is an UTRA-TDD CDMA wireless communication system.

18. A wireless communication unit capable of performing power control when operating in a wireless communication system, the wireless communication unit comprising:
power control processing means, further comprising:
means for determining a plurality of path losses for a wireless transmission, each path loss corresponding to one of a plurality of wireless transmission times;
means for deriving at least one parameter from a correlation between or among at least two of the plurality of path losses; and
adjustment means to adjust an output power level of said wireless communication unit in response to said at least one parameter.

19. The wireless communication unit according to claim 18, wherein said wireless communication unit is a user equipment for use in an open loop power control arrangement.

20. The wireless communication unit according to claim 18, further comprising:
a receiver operably coupled to said power control processing means for receiving a transmission from a second transmitting wireless communication unit; and
calculation means operably coupled to said path loss correlation metric determination means for calculating a plurality of instantaneous path loss values to be forwarded to said path loss correlation metric determination means.

21. The wireless communication unit according to claim 18, wherein said adjustment means adjusts the output power level of said wireless communication unit in an open power control loop for an up-link transmission by a wireless subscriber communication unit.

22. The wireless communication unit according to claim 18, wherein said adjustment means further comprises at least one of a weighting parameter input and a filter input, and wherein said adjustment means adjusts the output power level of said wireless communication unit by at least one of adjusting a weighting parameter based on a path loss correlation metric, and adjusting a frequency response of a filter.

23. The wireless communication unit according to claim 18, wherein said wireless communication unit is a base transceiver station or Node B for use in an open loop power control arrangement.

24. The wireless communication unit according to claim 18, wherein said power control is performed by a wireless subscriber communication unit for use in an open-loop up-link power control mode of operation.

25. The wireless communication unit according to claim 24, wherein said power control processing means selects said filtered combination of said instantaneous path loss measurements for calculating the output power level of said wireless communication unit when said wireless communication unit is traveling at a relatively high speed, or selects said plurality of instantaneous path loss measurements for calculating the output power level of said wireless communication unit when said wireless communication unit is traveling at a relatively low speed.

26. The wireless communication unit according to claim 18, wherein said power control processing means performs a plurality of instantaneous path loss measurements over a plurality of frames received by said wireless communication unit, and said path loss correlation metric is based on said plurality of instantaneous path loss measurements.

27. The wireless communication unit according to claim 26, wherein said path loss correlation metric is calculated by differentiator means based upon the plurality of instantaneous path loss measurements to obtain a path loss correlation indication.

28. The wireless communication unit according to claim 27, wherein said differentiator means determines a difference value and discards a sign of said difference value to obtain an absolute difference value to provide a path loss correlation indication.

29. The wireless communication unit according to claim 28, the power control processing function further comprising decision logic operably coupled to said differentiator means to compare said absolute difference value with a threshold value to provide a path loss correlation metric.

30. The wireless communication unit according to claim 29, wherein said path loss correlation metric determination is based on at least one of: a period of time over which instantaneous path loss measurements are collected, said threshold value for a difference between said path loss correlation metrics, and a number of path loss correlation metrics where said threshold value is exceeded over said period of time.

31. The wireless communication unit according to claim 29, the power control processing means further comprising a switch and a switch control, operably coupled to said decision logic, said switch and switch control configured to:
use said plurality of instantaneous path loss measurements to calculate the adjustment of output power level of said wireless communication unit if said absolute difference value is determined to be below a threshold value over a period of time; or
use a filtered combination of said plurality of instantaneous path loss measurements to calculate the adjustment of output power level of said wireless communication unit if said absolute difference value is determined to be above the threshold value over a period of time.

32. The wireless communication unit according to claim 28, the path loss correlation metric determination means further comprising variance estimator means to determine a variance of said difference value to provide a path loss correlation metric.

33. The wireless communication unit according to claim 32, the path loss correlation metric determination means further comprising:
averaging means operably coupled to said variance estimator means to provide a time-averaged path loss correlation metric.

34. The wireless communication unit according to claim 33, wherein said averaging means is operably coupled to a lookup table and compares said time-averaged path loss correlation metric to values held in the lookup table in order to calculate a weighting parameter based on the path loss correlation metric.

35. The wireless communication unit according to claim 34, the power control processing means further comprising calculation means for calculating an output transmit power level for said wireless communication unit, said calculation means using one of (i) said plurality of instantaneous path loss measurements and (ii) said filtered combination of said plurality of instantaneous path loss measurements in calculating an adjustment of output power level based on said weighting parameter.

36. A storage medium storing processor-implementable instructions for controlling a processor to carry out a method for performing power control in a wireless communication unit operating in a wireless communication system, the method comprising:
determining a plurality of path losses for a wireless transmission, each path loss corresponding to one of a plurality of wireless transmission times:
deriving at least one parameter from a correlation between or among at least two of the plurality of path losses; and
adjusting an output power level of said wireless communication unit in response to said at least one parameter.

* * * * *